(12) United States Patent
Berry et al.

(10) Patent No.: US 7,051,026 B2
(45) Date of Patent: May 23, 2006

(54) SYSTEM AND METHOD FOR MONITORING SOFTWARE LOCKS

(75) Inventors: Robert Francis Berry, Romsey (GB); Robert Todd Dimpsey, Austin, TX (US); Benjamin Joseph Hoflich, Austin, TX (US); Frank Eliot Levine, Austin, TX (US); Enio Manuel Pineda, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 10/210,832

(22) Filed: Jul. 31, 2002

(65) Prior Publication Data

US 2004/0024797 A1    Feb. 5, 2004

(51) Int. Cl.
*G06F 17/30* (2006.01)
(52) U.S. Cl. .................. 707/8; 707/101; 707/206
(58) Field of Classification Search ............... 712/23; 709/102; 717/127, 139, 140; 718/102; 707/104.1, 707/103, 102, 101, 100, 10, 9, 8, 7, 6, 5, 707/4, 3, 2, 1
See application file for complete search history.

(56) References Cited

U.S. PATENT DOCUMENTS

| | | | | |
|---|---|---|---|---|
| 6,487,652 | B1 * | 11/2002 | Gomes et al. ............... | 712/23 |
| 6,687,904 | B1 * | 2/2004 | Gomes et al. ............. | 718/102 |
| 6,691,304 | B1 * | 2/2004 | Zhang et al. ............... | 717/127 |
| 6,735,760 | B1 * | 5/2004 | Dice .......................... | 717/139 |
| 6,772,255 | B1 * | 8/2004 | Daynes ...................... | 710/200 |
| 6,792,601 | B1 * | 9/2004 | Dimpsey et al. ............ | 718/102 |

OTHER PUBLICATIONS

"Optimizeit Suite Complete Performance Solution for Java" Borland Marketing Pamphlet. (2 pgs), no date.
Jones et al., *Garbage Collection*, (pp. 106-107), no date.
Dimpsey et al., "Java Server Performance: A Case Study of Building Efficient, Scalable Jvms," *IBM Systems Journal* vol. 39, No. 1, 2000. (pp. 151-174).
Bacon et al., "Thin Locks: Featherweight Synchronization for Java," *ACM Proceedings*, vol. 33 No. 6, Jun. 1998. (11 pgs).

* cited by examiner

*Primary Examiner*—Jeffrey Gaffin
*Assistant Examiner*—Yicun Wu
(74) *Attorney, Agent, or Firm*—Vanleeuwen & Vanleeuwen; Joseph T. Vanleeuwen; Marilyn S. Dawkins

(57) ABSTRACT

A system and method for monitoring software locks is presented. Metric data collection is invoked only when thin lock contention arises in a computer system's application layer. Instrumentation in a computer system's middleware layer tracks time-based metric information such as a waiting time for an application to acquire a lock. Instrumentation tracks garbage collection events and removes garbage collection time durations from time-based metric data as to not distort time-based metric data. Instrumentation also tracks quantity-based events such as the number of applications that request a particular lock. An instrumentation user may retrieve metric data for computer system performance analysis.

19 Claims, 11 Drawing Sheets

SYSTEM AND METHOD FOR MONITORING SOFTWARE LOCKS

BACKGROUND OF THE INVENTION

1. Technical Field

The present invention relates in general to a system and method for monitoring software locks. More particularly, the present invention relates to a system and method for using instrumentation in a non-obtrusive manner to collect software lock metric data.

2. Description of the Related Art

Computer systems today typically include resources that are shared between multiple applications. For example, a computer system may have a database that many applications, or threads, have the ability to access. Computer systems use software locks to manage access to a shared resource. A software lock is a language-level construct for providing mutually exclusive access to a shared resource in a multi-threaded environment.

The computer system includes three layers which are an operating system layer, a middleware layer, and an application layer. The operating system layer is the operating system which the middleware layer and application layer run on. For example, the operating system may be a UNIX operating system. The middleware layer is an application that runs on top of the operating system and interfaces with the application layer. Using the example described above, the middleware layer may be a Java Virtual Machine (JVM). The application layer is the layer where applications run. Using the example described above, the application layer may be a Java application that runs on top of the JVM.

One type of software lock is a "bimodal" software lock. A bimodal software lock has two states which are "thin locks" and "thick locks." These states are also called "deflated" (for thin locks) and "inflated" (for thick locks). Thin locks are located in the computer system's application layer and include characteristics such as speed, small size, and portability. Thick locks are used when contentions arise for a thin lock (i.e. one application requests the thin lock when a different application currently owns the lock). Thick locks are located in the computer system's operating system layer. Thick locks are typically expensive in terms of processing time and should be avoided if possible.

When a first application wishes to use a shared resource, the first application sends a request to a corresponding thin lock. If the thin lock is not owned by another application, the first application acquires the lock without contention. When a second application wishes to use the same shared resource while the first application owns the thin lock, contention arises for the thin lock. A lock manager in the middleware layer is invoked and processes the second application's lock request. The lock manager examines lock data structures to determine if a queue has been established to acquire a thick lock corresponding to the software lock. The lock data structures include information pertaining to thick locks located in the operating system. The lock manager may wait (i.e. spin) for a period of time to see if the first application releases the thin lock before adding the second application to the queue.

Computer systems often include instrumentation to track system performance such as lock management performance. A challenge found with existing instrumentation is the overhead associated with the instrumentation and that the overhead may degrade system performance and distort the data that the instrumentation is measuring. For example, the instrumentation may use extensive processing time which, in turn, may slow down an application that the instrumentation is monitoring.

Additionally, the computer system typically has garbage collection events which may occur during instrumentation data collection times. A garbage collection event is occasionally performed which stops processing from performing other tasks. For example, a garbage collection event may be performed to restructure, or defragment a database in order to allow the computer system to operate efficiently. Garbage collection events may distort time-based metrics, such as the time an application takes to acquire a lock, if garbage collection events occur during instrumentation data collection periods.

What is needed, therefore, is a system and method that monitors software locks with minimal overhead and removes garbage collection events from metric data.

SUMMARY

It has been discovered that the aforementioned challenges are resolved by invoking instrumentation only during lock contention of bimodal locks and tracking garbage collection times in order to remove the garbage collection times from metric data. The instrumentation is located in a computer system's middleware layer which tracks metric data corresponding to lock contentions in the computer system's application layer.

The instrumentation initializes and tracks metric data only during bimodal lock contentions in the computer system's application layer (i.e., only when the lock is "inflated"). A lock manager provides metric data to the instrumentation that the instrumentation stores in a memory area for later retrieval by an instrumentation user. The instrumentation also performs time-based metric calculations using the lock manager's metric data. The instrumentation user uses an instrumentation application to configure the instrumentation and examine the metric data. The instrumentation application is located in the computer system's middleware layer.

The instrumentation tracks various metric values corresponding to a particular lock's activity, such as an entry count, a slow count, a recursive count, a queue size count, and a spin count. The entry count tracks the number of lock requests a middleware lock manager receives corresponding to a particular lock. For example, when a second application requests a lock that is in use by a first application (i.e. contention), the second application enters middleware lock manager processing and the entry count is incremented.

The slow count keeps track of the number of times a particular lock is acquired after waiting. Using the example described above, the slow count is incremented when the second application acquires the lock after the first application releases the lock.

The recursive count tracks the number of times that an application requests a lock that the application already owns. This re-requesting event may occur in situations where the application does not know that it already owns the lock. Using the example described above, the first application may request the lock while the first application still owns the lock.

The queue size count tracks the number of applications waiting in a queue to acquire a lock. The queue size count may be configured to track various metrics corresponding to the queue. For example, the queue size count may track a maximum number of applications waiting for a lock between resets. Another example is the queue size count may track the average number of applications waiting for a lock between resets.

The spin loop count is the number of times a requester "spins" before either being put in the queue or acquiring the lock. The middleware lock manager may put the requestor in a "spin loop" for a specified time period before putting a requester in a queue to wait for a contended lock. The middleware lock manager waits for the spin loop time period to see if the current lock owner releases the contended lock. This is performed to avoid putting the requestor in the queue, which may be expensive in terms of processing time.

The instrumentation also monitors garbage collection events invoked by a garbage collector in order to provide accurate time-based metric information to the instrumentation user. The garbage collector occasionally performs a garbage collection event which stops processing from performing other tasks. For example, the garbage collector may perform a garbage collection event to restructure, or defragment a database in order to allow the middleware layer to perform efficiently. The instrumentation removes garbage collection duration periods from time-based metric values in order to not distort time-based metric values. The instrumentation user examines metrics data to analyze the lock management performance of the computer system.

Instrumentation tracks various time-based metrics corresponding to a particular lock such as a hold time, a get time, and a wait time. The hold time is the total time that a particular lock is in use by one or more applications. For example, if a first application uses the lock for twenty clock cycles and a second application uses the lock for thirty clock cycles, the lock's hold time is fifty clock cycles.

The get time is the sum of time that each application spends waiting to acquire the lock. Using the example described above, if the first application waits thirty clock cycles to acquire the lock and the second application waits ten clock cycles to acquire the lock, the get time corresponding to the lock is forty clock cycles.

The wait time is the total time spent by applications waiting for a particular lock. As compared to the get time, the get time may "double-count" clock cycles if two applications are waiting for a lock at the same time whereas the wait time just calculates the total, or absolute time, that applications, regardless of quantity, wait for a lock.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
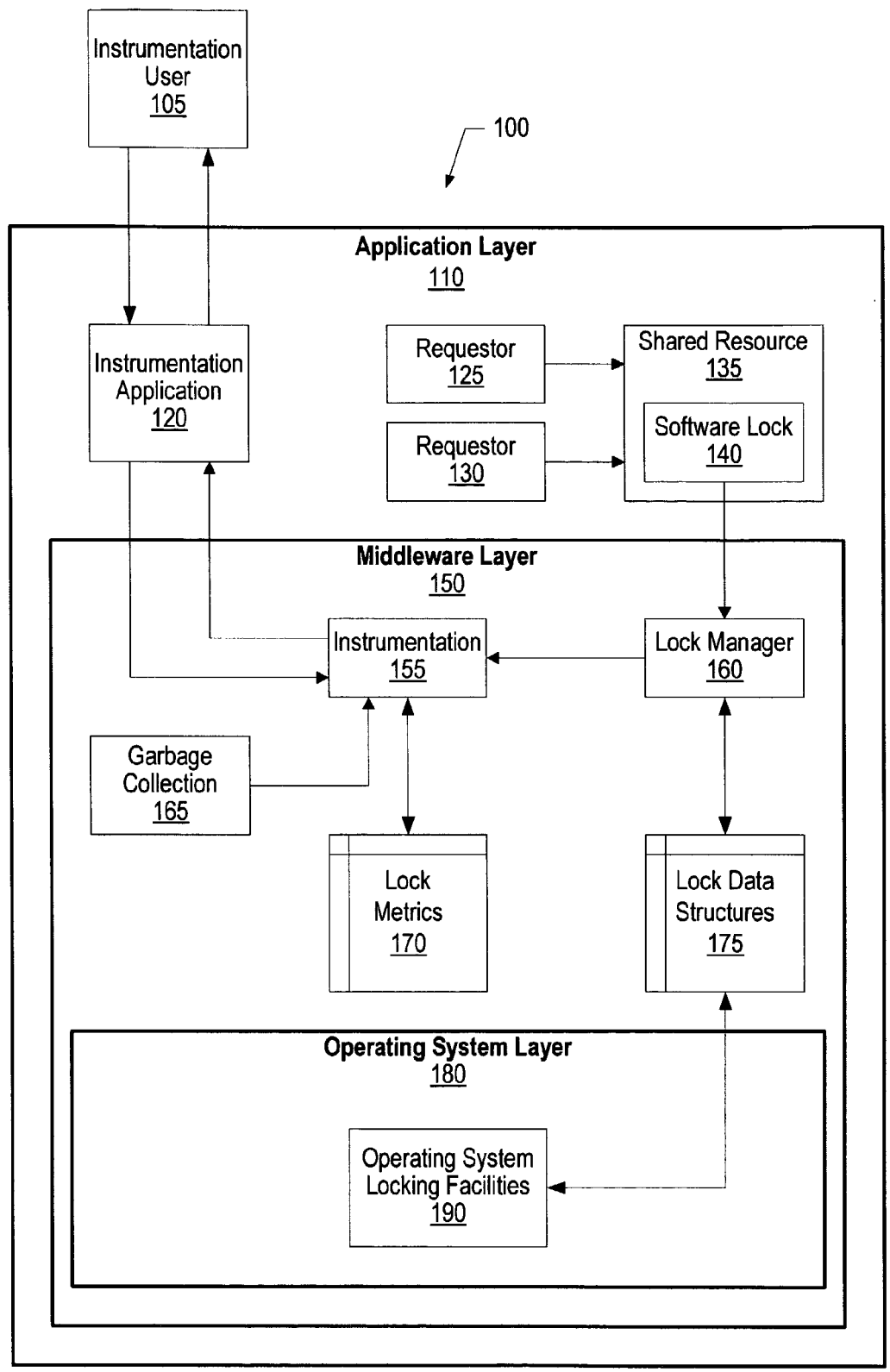
FIG. 1 is a diagram showing a middleware application managing locks between an application layer and an operating system (OS) layer.

FIG. 1 is a diagram showing a middleware application managing locks between an application layer and an operating system (OS) layer. Computer system 100 includes three layers which are operating system layer 180, middleware layer 150, and application layer 110. Operating system layer 180 is the operating system which middleware layer 150 and application layer run. For example, operating system layer 180 may be a UNIX operating system. Middleware layer 150 is an application that runs on top of operating system layer 180 and interfaces with application layer 110. For example middleware layer 150 may be a Java Virtual Machine (JVM). Application layer 110 is the layer where applications run. Using the example described above, application layer 110 may be a Java application that runs on top of the JVM.

Operating system layer 180 includes operating system locking facilities 190. Operating system locking facilities 190 handles lock contentions when they arise in application layer 110 by providing a "thick lock" for use by requesters. Thick locks are typically expensive in terms of processing time and should be avoided if possible.

Application layer 110 includes requestor 125 and requester 130. Requestor 125 is the first requestor to request software lock 140 which is located in shared resource 135. Software lock 140 is not currently owned by a requester so requester 125 acquires the lock without contention. Since no contention exists, lock manager 160 located in middleware layer 150 is not invoked. Requestor 130 sends a request to acquire software lock 140. Requestor 125 is still using software lock 140 in which contention arises with software lock 140.

Lock manager 160 is invoked and processes requester 130's lock request. Lock manager 160 examines lock data structures 175 to determine if a queue has been established to acquire a thick lock corresponding to software lock 140 in operating system locking facilities 190. Lock data structures 175 includes information pertaining to thick locks located in operating system locking facilities 190. Lock data structures 175 are typically stored in volatile storage areas, such as RAM, but may also be stored on a non-volatile storage area, such as non-volatile memory. Lock manager 160 may wait (i.e. spin) for a period of time to determine if software lock 140 is released before adding requester 130 to the queue.

Lock manager 160 provides information to instrumentation 155 corresponding to contended lock requests. Instrumentation 155 stores metric information in lock metrics 170 (see FIG. 5 and corresponding text for further information regarding metric information). Lock metrics 170 may be stored in a non-volatile storage area, such as non-volatile memory.

Instrumentation user 105 uses instrumentation application 120 to interface with instrumentation 155. Application 120 communicates with instrumentation 155 using known techniques, such as sockets or by instrumentation 155 providing application programming interfaces (APIs) that are called by application 120 for requesting instrumentation data (stored in lock metrics 170) and for instructing instrumentation regarding its operating parameters. Instrumentation application 120 provides instrumentation user 105 the ability to configure instrumentation 155 to track and provide various metric information. Instrumentation 155 tracks metric information in response to instrumentation 105's requests. Instrumentation 155 monitors garbage collection events invoked by garbage collection 165 in order to provide accurate time-based metric information to instrumentation user 105. Garbage collection 165 occasionally performs a garbage collection event which stops processing from performing other tasks. For example, garbage collection 165 may perform a garbage collection event to restructure, or defragment a database in order to allow middleware layer 150 to perform efficiently (see FIG. 8 and corresponding text for further details regarding garbage collection time adjustments).

Instrumentation user 105 uses instrumentation application 120 to send a metrics display request to instrumentation 155. Instrumentation 155 retrieves metrics data from lock metrics 170, and provides the metrics data to instrumentation application 120. Instrumentation user 105 examines the metrics data to analyze the lock performance of computer system 100.

Figure 2:
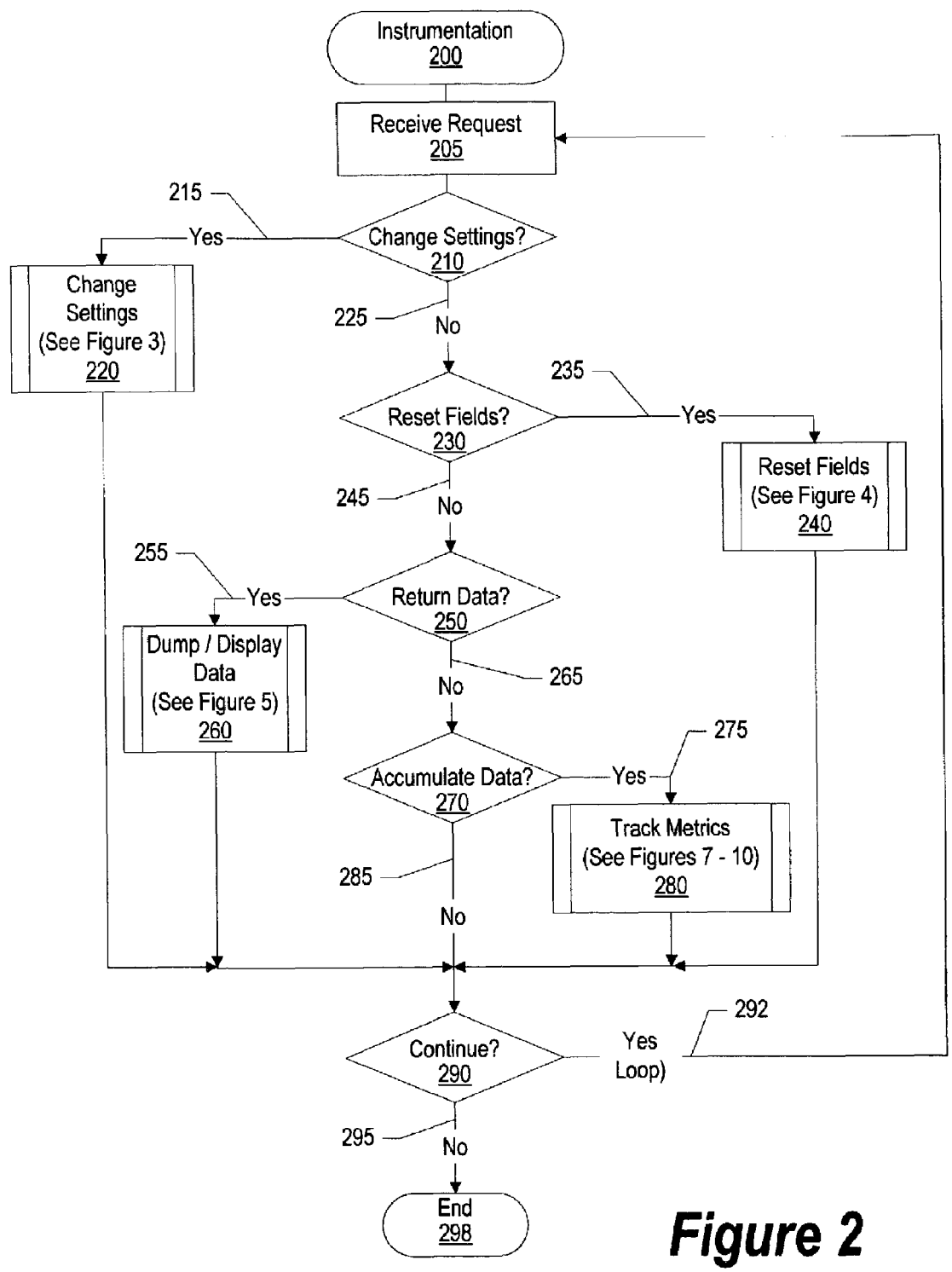
FIG. 2 is a flowchart showing steps taken in an instrumentation application handling a user request.

FIG. 2 is a flowchart showing steps taken in an instrumentation application handling a user request. Instrumentation application processing commences at 200, whereupon processing receives a request from a user (step 205). A determination is made as to whether the user wishes to change metric settings (decision 210). For example, the user may configure instrumentation to track one or more time-based metrics corresponding to a middleware lock manager. If the user's request is to change metric settings, decision 210 branches to "Yes" branch 215 whereupon the user changes metric settings (pre-defined process block 220, see FIG. 3 and corresponding text for further details).

On the other hand, if the user's request is not to change metric settings, decision 210 branches to "No" branch 225 whereupon a determination is made as to whether the user's request is a reset request (decision 230). For example, the user may choose to reset one or more metric fields to zero. If the user's request is to reset one or more metric fields, decision 230 branches to "Yes" branch 235 whereupon the user resets one or more metric fields (pre-defined process block 240, see FIG. 4 and corresponding text for further details).

On the other hand, if the user's request is not to reset one or more metric fields, decision 230 branches to "No" branch 245 whereupon a determination is made as to whether the user's request is a metrics display request (decision 250). Metric data is tracked based upon the users metric settings (see FIG. 3 and corresponding text for further details regarding metric settings). If the user's request is to receive metric data, decision 250 branches to "Yes" branch 255 whereupon processing retrieves and displays metric data to the user (pre-defined process block 260, see FIG. 5 and corresponding text for further details).

On the other hand, if the user's request is not a metrics display request, decision 250 branches to "No" branch 265 whereupon a determination is made as to whether the user wishes to accumulate metric data (decision 270). Instrumentation tracking may halt when the user is analyzing data or resetting data, and resume when the user is finished with his analysis. If the user's request is to start accumulating metric data, decision 270 branches to "Yes" branch 275 whereupon processing starts metric tracking (see FIGS. 7 through 10 for further details).

On the other hand, if the user's request is not to start tracking metric data, decision 270 branches to "No" branch 285 whereupon a determination is made as to whether to continue instrumentation application processing (decision 290). If instrumentation application processing should continue, decision 290 branches to "Yes" branch 292 which loops back to receive and process the next request. This looping continues until instrumentation application processing terminates, at which point decision 290 branches to "No" branch 295. Processing ends at 298.

Figure 3:
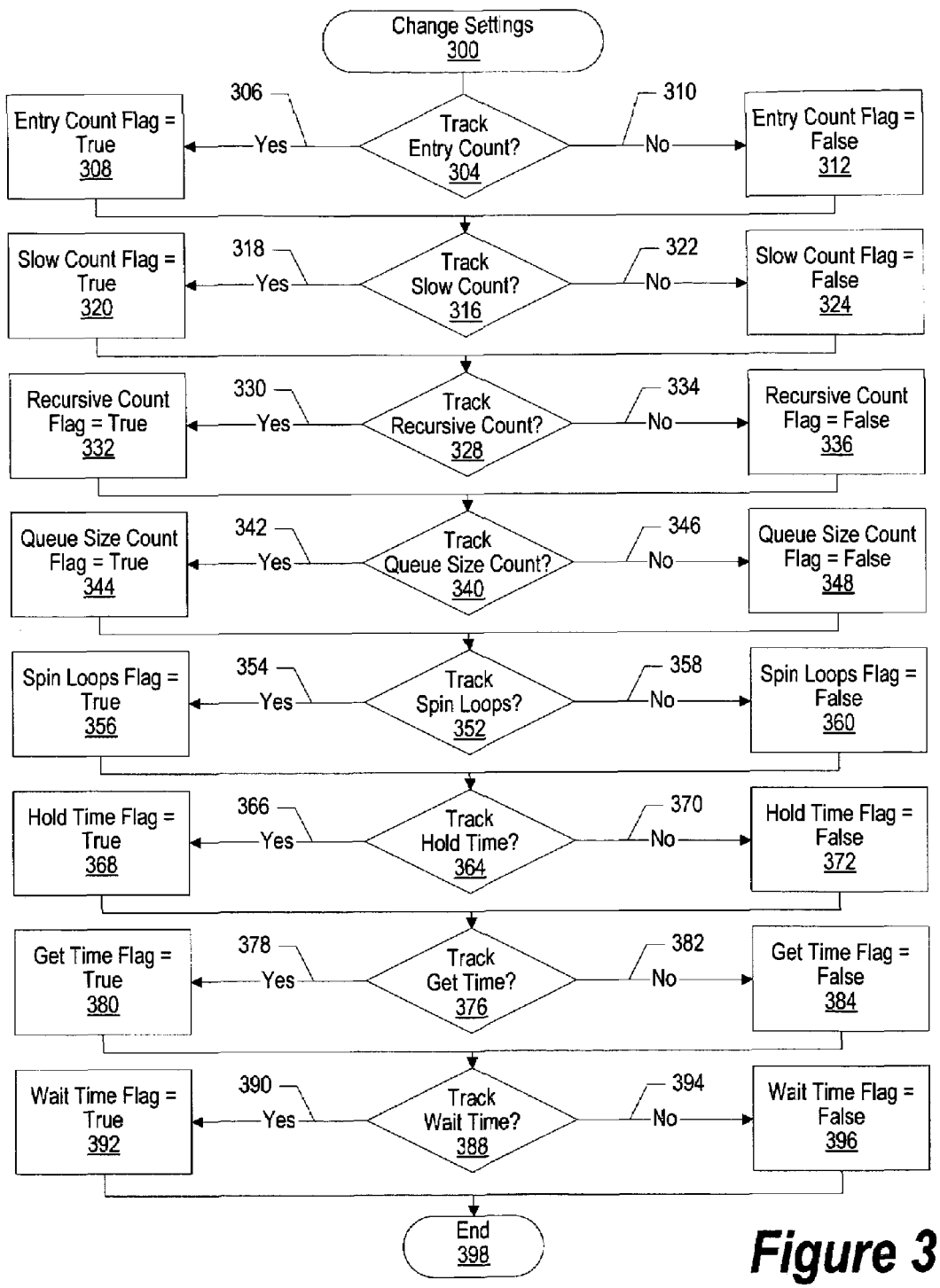
FIG. 3 is a flowchart showing steps taken in changing metrics settings.

FIG. 3 is a flowchart showing steps taken in changing metric settings. While individual flags are shown being set and checked herein and on other figures, it will be appreciated by those skilled in the art that a single flag may be used for in lieu of the multiple flags shown herein. For example, individual bits in an eight bit byte can be used to turn off and on various flags shown herein. The value of the byte, rather than the individual bits, can thusly be checked to determine which individual flags are being used. In addition, some of the flags shown herein can be grouped (such as flags dealing with timing). In some embodiments it may be more efficient and convenient to group functions using a single flag (e.g., a timing flag) rather than using the individual flags shown herein.

Processing commences at 300, whereupon a determination is made as to whether to track an entry count (decision 304). The entry count tracks the number of lock requests a middleware lock manager receives corresponding to a particular lock. For example, when a second application requests a lock that is in use by a first application (i.e. contention), the second application enters middleware lock manager processing and the entry count is incremented (see FIG. 7 and corresponding text for further details regarding entry count tracking). If an instrumentation user wishes to track the entry count, decision 304 branches to "Yes" branch 306 whereupon an entry count flag is set to "true" (step 308). On the other hand, if the instrumentation user does not wish to track the entry count, decision 304 branches to "No" branch 310 whereupon the entry count flag is set to "false" (step 312).

A determination is made as to whether to track a slow count (decision 316). The slow count keeps track of the number of times a particular lock is acquired after waiting. Using the example described above, the slow count is incremented when the second application acquires the lock after the first application releases the lock (see FIG. 8 and corresponding text for further details regarding slow count tracking). If the instrumentation user wishes to track the slow count, decision 316 branches to "Yes" branch 318 whereupon a slow count flag is set to "true" (step 320). On the other hand, if the instrumentation user does not wish to track the slow count, decision 316 branches to "No" branch 322 whereupon the slow count flag is set to "false" (step 324).

A determination is made as to whether to track a recursive count (decision 328). The recursive count tracks the number of times that an application requests a lock when the application currently owns the lock. This re-requesting event may occur in situations where the application does not know that it already owns the lock. Using the example described above, the first application may request the lock while the first application still owns the lock (see FIG. 7 and corresponding text for further details regarding recursive count tracking). If the instrumentation user wishes to track the recursive count, decision 328 branches to "Yes" branch 330 whereupon a recursive count flag is set to "true" (step 332). On the other hand, if the instrumentation user does not wish to track the recursive count, decision 328 branches to "No" branch 334 whereupon the recursive count flag is set to "false" (step 336).

A determination is made as to whether to track a queue size count (decision 340). The queue size count tracks the number of applications waiting in a queue to acquire a lock. The queue size count may be configured to track various metrics corresponding to the queue. For example, the queue size count may track a maximum number of applications waiting for a lock between resets. Another example is the queue size count may track the average number of applications waiting for a lock between resets (see FIG. 7 and corresponding text for further details regarding queue size tracking). If the instrumentation user wishes to track the queue size count, decision 340 branches to "Yes" branch 342 whereupon a queue size count flag is set to "true" (step 344). On the other hand, if the instrumentation user does not wish to track the queue size count, decision 340 branches to "No" branch 346 whereupon the queue size count flag is set to "false" (step 348).

A determination is made as to whether to track spin loops (decision 352). Before putting a requester in a queue to wait for a contended lock, the middleware lock manager may put the requester in a "spin loop" for a specified time period. The middleware lock manager waits for the spin loop time period to see if the current lock owner releases the contended lock. This is performed to avoid putting the requester in the queue, which may be expensive in terms of processing time (see FIG. 7 and corresponding text for further details regarding spin loop tracking). If the instrumentation user wishes to track spin loops, decision 352 branches to "Yes" branch 354 whereupon a spin loops flag is set to "true" (step 356). On the other hand, if the instrumentation user does not wish track spin loops, decision 352 branches to "No" branch 358 whereupon the spin loops flag is set to "false" (step 360).

A determination is made as to whether to track a hold time (decision 364). The hold time is the total time that a lock is held by one or more requesters (see FIG. 10 and corresponding text for further details regarding hold calculations). If the instrumentation user wishes to track the hold time, decision 364 branches to "Yes" branch 366 whereupon a hold time flag is set to "true" (step 368). On the other hand, if the instrumentation user does not wish to track the hold time, decision 364 branches to "No" branch 370 whereupon the hold time flag is set to "false".

A determination is made as to whether to track a get time (decision 376). The get time is the sum of time that each thread (i.e. requester) spends waiting to acquire a lock (see FIG. 10 and corresponding text for further details regarding get time calculations). If the instrumentation user wishes to track the get time, decision 376 branches to "Yes" branch 378 whereupon a get time flag is set to "true" (step 380). On the other hand, if the instrumentation user does not wish to track the get time, decision 376 branches to "No" branch 382 whereupon the get time flag is set to "false".

A determination is made as to whether to track a wait time (decision 388). The wait time is the total time that one or more threads wait for a particular lock (see FIG. 10 and corresponding text for further details regarding wait time calculation). If the instrumentation user wishes to track the wait time, decision 388 branches to "Yes" branch 390 whereupon a wait time flag is set to "true" (decision 392). On the other hand, if the instrumentation user does not wish to track the wait time, decision 388 branches to "No" branch 394 whereupon the wait time flag is set to "false". Processing ends at 398.

Figure 4:
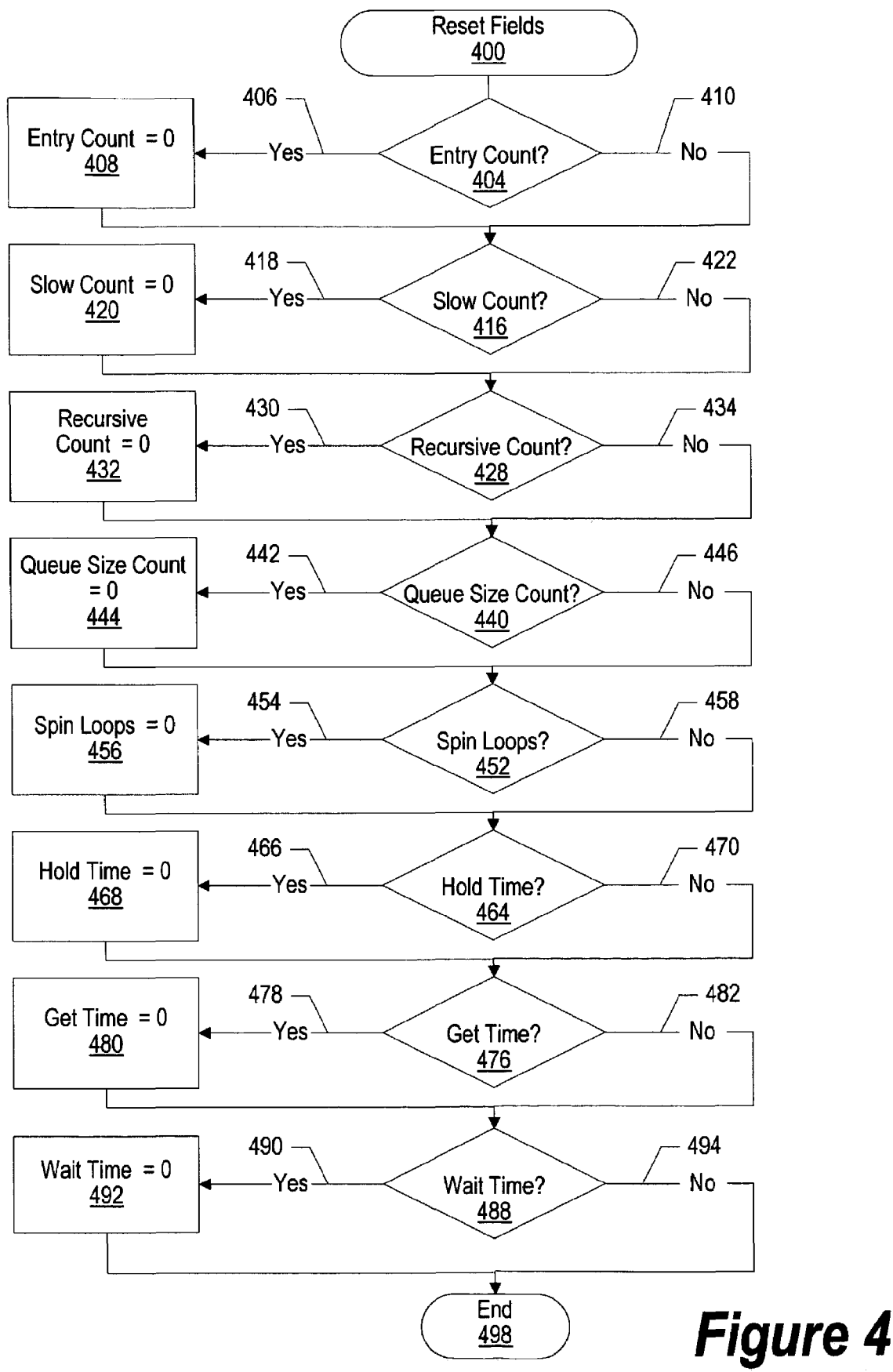
FIG. 4 is a flowchart showing steps taken in resetting metrics settings.

FIG. 4 is a flowchart showing steps taken in resetting metric settings. Reset processing commences at 400, whereupon a determination is made as to whether to reset an entry count field (decision 404). The entry count field includes the number lock requests a middleware lock manager receives corresponding to a particular lock. For example, when a second application requests a lock that is in use by a first application (i.e. contended), the second application enters middleware lock manager processing and the entry count is incremented (see FIG. 7 and corresponding text for further details regarding entry count tracking). If an instrumentation user wishes to reset the entry count field, decision 404 branches to "Yes" branch 406 whereupon the entry count field is reset to zero (step 408). On the other hand, if the instrumentation user does not wish to reset the entry count field, decision 404 branches to "No" branch 410 bypassing entry count field resetting steps.

A determination is made as to whether to reset a slow count field (decision 416). The slow count field includes the number of times a particular lock is acquired after waiting. Using the example described above, the slow count is incremented when the second application acquires the lock after the first application releases the lock (see FIG. 8 and corresponding text for further details regarding slow count tracking). If the instrumentation user wishes to reset the slow count field, decision 416 branches to "Yes" branch 418 whereupon the slow count field is reset to zero (step 420). On the other hand, if the instrumentation user does not wish to reset the slow count field, decision 416 branches to "No" branch 422 bypassing slow count field resetting steps.

A determination is made as to whether to reset a recursive count field (decision 428). The recursive count field includes the number of times that an application requests a lock when the application currently owns the lock. This re-requesting event may occur in situations where the application does not know that it already owns the lock. Using the example described above, the first application may request the lock while the first application still owns the lock (see FIG. 7 and corresponding text for further details regarding recursive count tracking). If the instrumentation user wishes to reset the recursive count field, decision 428 branches to "Yes" branch 430 whereupon the recursive count field is reset to zero (step 432). On the other hand, if the instrumentation user does not wish to reset the recursive count field, decision 428 branches to "No" branch 434 bypassing recursive count field resetting steps.

A determination is made as to whether to reset a queue size count field (decision 440). The queue size count field includes the number of applications waiting in a queue to acquire a particular lock. The queue size count may be configured to track various metrics corresponding to the queue. For example, the queue size count may track a maximum number of applications waiting for a lock between resets. Another example is the queue size count may track the average number of applications waiting for a lock between resets (see FIG. 7 and corresponding text for further details regarding queue size tracking). If the instrumentation user wishes to reset the queue size count field, decision 440 branches to "Yes" branch 442 whereupon the queue size count field is reset to zero (step 444). On the other hand, if the instrumentation user does not wish to reset the queue size count field, decision 440 branches to "No" branch 446 bypassing queue size count field resetting steps.

A determination is made as to whether to reset a spin loops field (decision 452). Before putting a requester in a queue to wait for a contended lock, the middleware lock manager may put the requester in a "spin loop" for a specified time period. The spin loop field includes the number of times that the requester spins before a lock is available. This is performed to avoid putting the requester in the queue, which may be expensive in terms of processing time (see FIG. 7 and corresponding text for further details regarding spin loop tracking). If the instrumentation user wishes to reset the spin loops field, decision 452 branches to "Yes" branch 454 whereupon the spin loops field is reset to zero (step 456). On the other hand, if the instrumentation user does not wish reset the spin loops field, decision 452 branches to "No" branch 458 bypassing spin loops field resetting steps.

A determination is made as to whether to reset a hold time field (decision 464). The hold time field includes the total time that a lock is held by one or more requesters (see FIG. 10 and corresponding text for further details regarding hold calculations). If the instrumentation user wishes to reset the hold time field, decision 464 branches to "Yes" branch 466 whereupon the hold time field is reset to zero (step 468). On the other hand, if the instrumentation user does not wish to reset the hold time field, decision 464 branches to "No" branch 470 bypassing hold time field resetting steps.

A determination is made as to whether to reset a get time field (decision 476). The get time field includes the sum of time that each thread (i.e. requester) spends waiting for a lock (see FIG. 10 and corresponding text for further details regarding get time calculations). If the instrumentation user wishes to reset the get time field, decision 476 branches to "Yes" branch 478 whereupon the get time field is reset to zero (step 480). On the other hand, if the instrumentation user does not wish to reset the get time field, decision 476 branches to "No" branch 482 bypassing get time field resetting steps.

A determination is made as to whether to reset a wait time field (decision 488). The wait time field includes the total time that one or more threads wait for a particular lock (see FIG. 10 and corresponding text for further details regarding wait time calculation). If the instrumentation user wishes to reset the wait time field, decision 488 branches to "Yes" branch 490 whereupon the wait time field is reset to zero (step 492). On the other hand, if the instrumentation user does not wish to reset the wait time field, decision 488 branches to "No" branch 494 bypassing wait time field resetting steps. Processing ends at 498.

Figure 5:
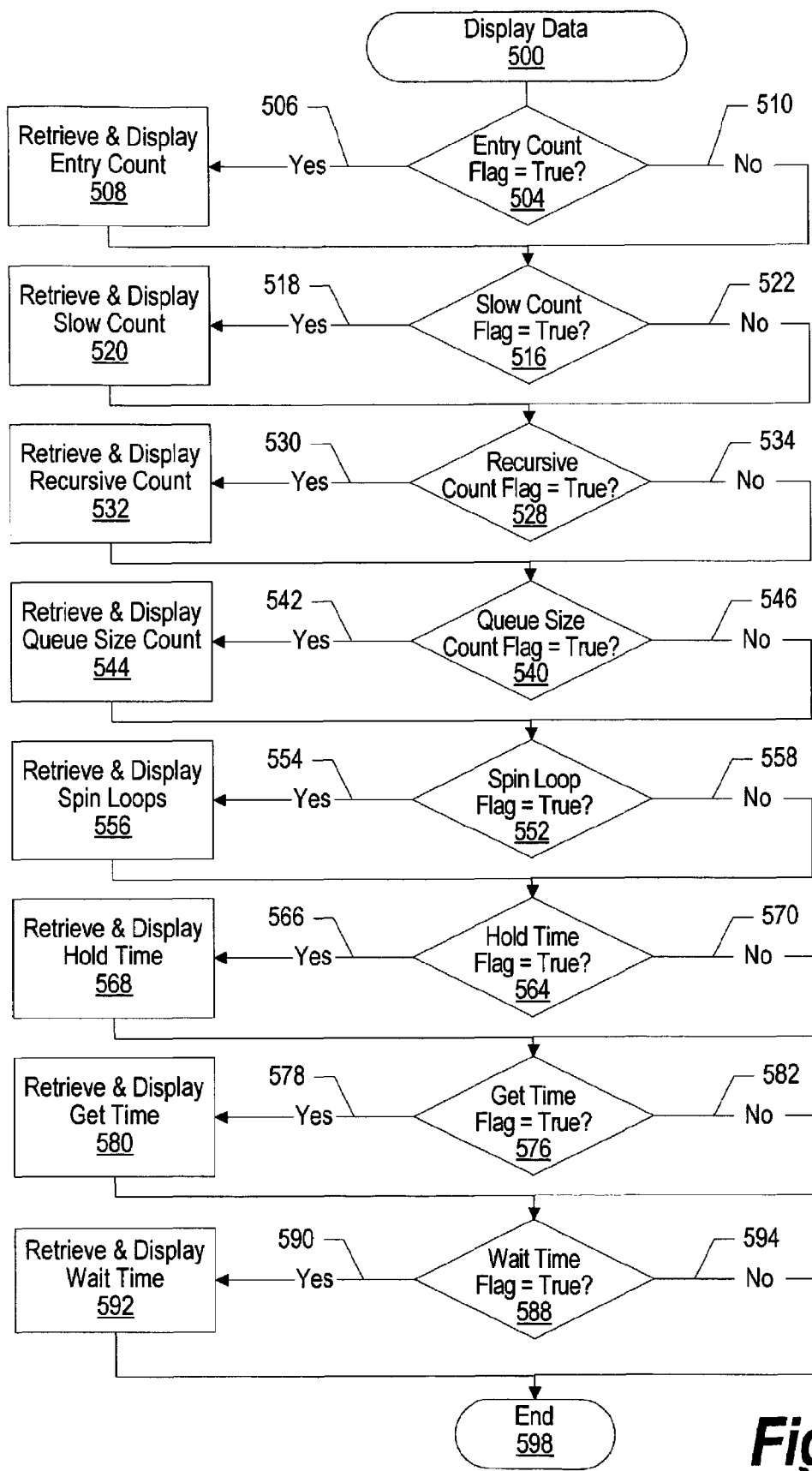
FIG. 5 is a flowchart showing steps taken in displaying one or more metric values in response to receiving a metrics display request from an instrumentation user.

FIG. 5 is a flowchart showing steps taken in displaying one or more metric values in response to receiving a metrics display request from an instrumentation user. Processing commences at 500, whereupon a determination is made as to whether to retrieve and display entry count information by examining an entry count flag (decision 504). The entry count information includes the number of lock requests a middleware lock manager receives corresponding to a particular lock. For example, when a second application requests a lock that is in use by a first application (i.e. contended), the second application enters middleware lock manager processing and the entry count is incremented (see FIG. 7 and corresponding text for further details regarding entry count tracking). If the entry count flag is set to "true", decision 504 branches to "Yes" branch 506 whereupon processing retrieves and displays entry count information (step 508). On the other hand, if the entry count flag is set to "false", decision 504 branches to "No" branch 510 bypassing entry count retrieval and displaying steps.

A determination is made as to whether to retrieve and display slow count information by examining a slow count flag (decision 516). The slow count information includes the number of times a particular lock is acquired after waiting. Using the example described above, the slow count is incremented when the second application acquires the lock after the first application releases the lock (see FIG. 8 and corresponding text for further details regarding slow count tracking). If the slow count flag is set to "true", decision 516 branches to "Yes" branch 518 whereupon processing retrieves and displays slow count information (step 520). On the other hand, if the slow count field is set to "false", decision 516 branches to "No" branch 522 bypassing slow count retrieval and displaying steps.

A determination is made as to whether to retrieve and display recursive count information by examining a recursive count flag (decision 528). The recursive count information includes the number of times that an application requests a lock with the application currently owns the lock. This re-requesting event may occur in situations where the application does not know that it already owns the lock. Using the example described above, the first application may request the lock while the first application still owns the lock (see FIG. 7 and corresponding text for further details regarding recursive count tracking). If the recursive count flag is set to "true", decision 528 branches to "Yes" branch 530 whereupon processing retrieves and displays recursive count information (step 532). On the other hand, if the recursive count field is set to "false", decision 528 branches to "No" branch 534 bypassing recursive count retrieval and displaying steps.

A determination is made as to whether to retrieve and display queue size count information by examining a queue size count flag (decision 540). The queue size count information includes the number of applications waiting in a queue to acquire a lock. The queue size count may be configured to track various metrics corresponding to the queue. For example, the queue size count may track a maximum number of applications waiting for a lock between resets. Another example is the queue size count may track the average number of applications waiting for a lock between resets (see FIG. 7 and corresponding text for further details regarding queue size tracking). If the queue size count flag is set to "true", decision 540 branches to "Yes" branch 542 whereupon processing retrieves and displays queue size count information (step 544). On the other hand, if the queue size count flag is set to "false", decision 540 branches to "No" branch 546 bypassing queue size count retrieval and displaying steps.

A determination is made as to whether to retrieve and display spin loop information by examining a spin loop flag (decision 552). Before putting a requester in a queue to wait for a contended lock, the middleware lock manager may put the requester in a "spin loop" for a specified time period. The spin loop field includes the number of times that a requester spins before a lock is available. This is performed to avoid putting the requester in the queue, which may be expensive in terms of processing time (see FIG. 7 and corresponding text for further details regarding spin loop tracking). If the spin loop flag is set to "true", decision 552 branches to "Yes" branch 554 whereupon processing retrieves and displays spin loop information (step 556). On the other hand, if the spin loop flag is set to "false", decision 552 branches to "No" branch 558 bypassing spin loops retrieval and displaying steps.

A determination is made as to whether to retrieve and display hold time information (decision 564). The hold time information includes the total time that a lock is acquired by one or more requesters (see FIG. 10 and corresponding text for further details regarding hold calculations). If the hold time flag is set to "true", decision 564 branches to "Yes" branch 566 whereupon processing retrieves and displays the hold time information (step 568). On the other hand, if the hold time flag is set to "false", decision 564 branches to "No" branch 570 bypassing hold time retrieval and displaying steps.

A determination is made as to whether to retrieve and display get time information by examining a get time flag (decision 576). The get time information includes the sum of time that each thread (i.e. requester) spends waiting for a lock (see FIG. 10 and corresponding text for further details regarding get time calculations). If the get time flag is set to "true", decision 576 branches to "Yes" branch 578 whereupon processing retrieves and displays get time information (step 580). On the other hand, if the get time flag is set to "false", decision 576 branches to "No" branch 582 bypassing get time retrieval and displaying steps.

A determination is made as to whether to retrieve and display wait time information (decision 588). The wait time information includes the total time that one or more threads wait for a particular lock (see FIG. 10 and corresponding text for further details regarding wait time calculation). If the wait time flag is set to "true", decision 588 branches to "Yes" branch 590 whereupon processing retrieves and displays wait time information (step 592). On the other hand, if the wait time flag is set to "false", decision 588 branches to "No" branch 594 bypassing wait time retrieval and displaying steps. Processing ends at 598.

For the various metrics displayed during the processing shown in FIG. 5, in some implementations not all metrics will be applicable, either due to the application being monitored or due to the metrics that the user wanted tracked (see FIG. 3). In these instances, the display described above would show that the individual metric is "not applicable" to inform the user that metrics were not taken or that metric values are not applicable for the particular metric.

Figure 6:
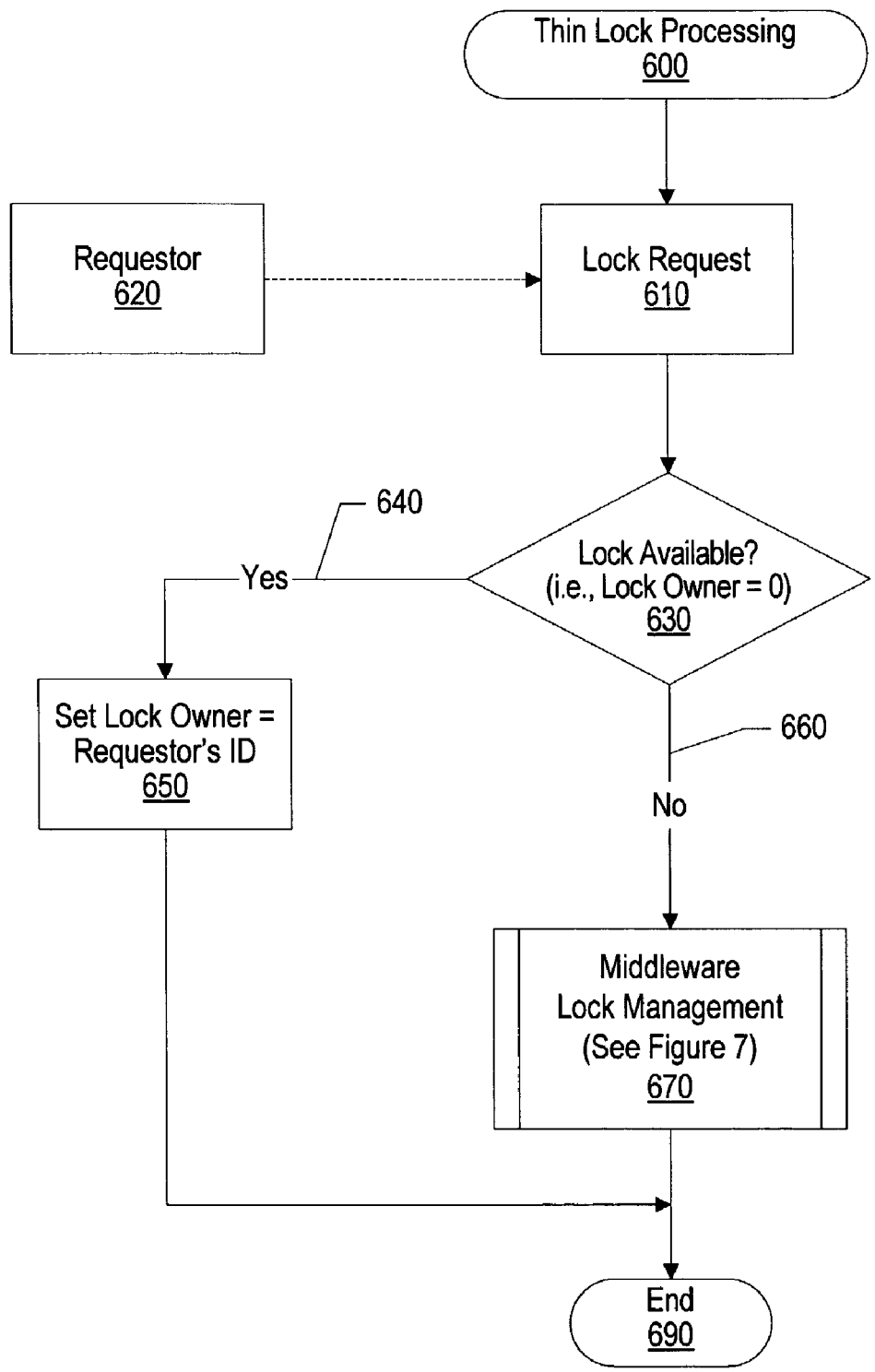
FIG. 6 is a flowchart showing steps taken in processing a lock request.

FIG. 6 is a flowchart showing steps taken in processing a lock request. Thin lock processing commences at 600, whereupon requester 620 sends a lock request (step 610). Requestor 620 may be an application that is requesting a bimodal software lock at the application layer.

A determination is made as to whether the corresponding bimodal lock is available (i.e. lock owner=0) (decision 630). Middleware lock management is invoked only when the software lock at the application layer is not available for a requesting application (i.e. contended). If the corresponding lock is available, decision 630 branches to "Yes" branch 640 whereupon processing gives the lock to requestor 620 (i.e. lock owner=requester 620's ID). On the other hand, if the lock is not available, decision 630 branches to "No" branch 660 whereupon middleware lock management is invoked to handle the lock contention (pre-defined process block 670, see FIG. 7 and corresponding text for further details regarding lock request processing). Processing ends at 690.

Figure 7:
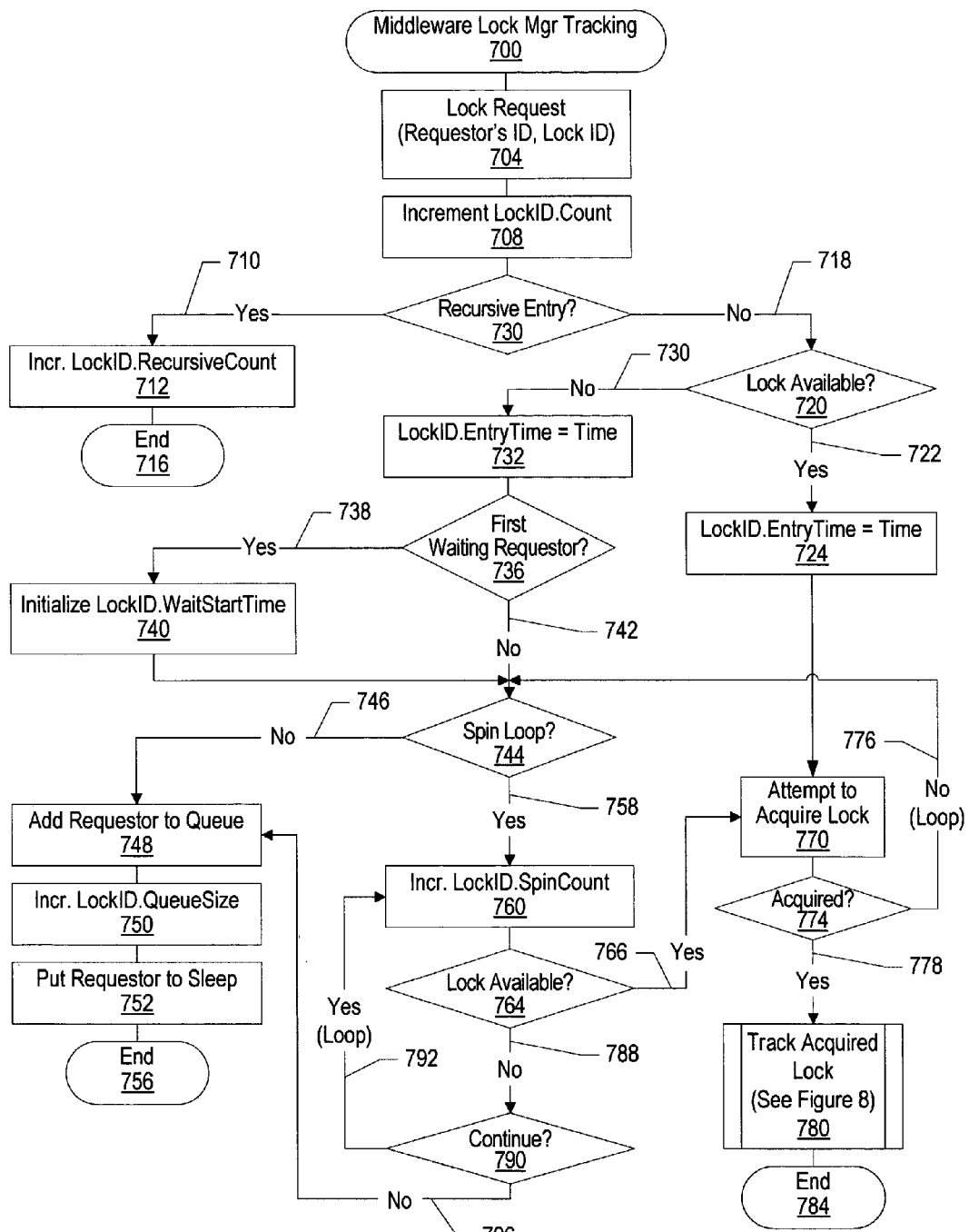
FIG. 7 is a flowchart showing steps taken in a middleware lock manager processing a lock request.
Figure 8:
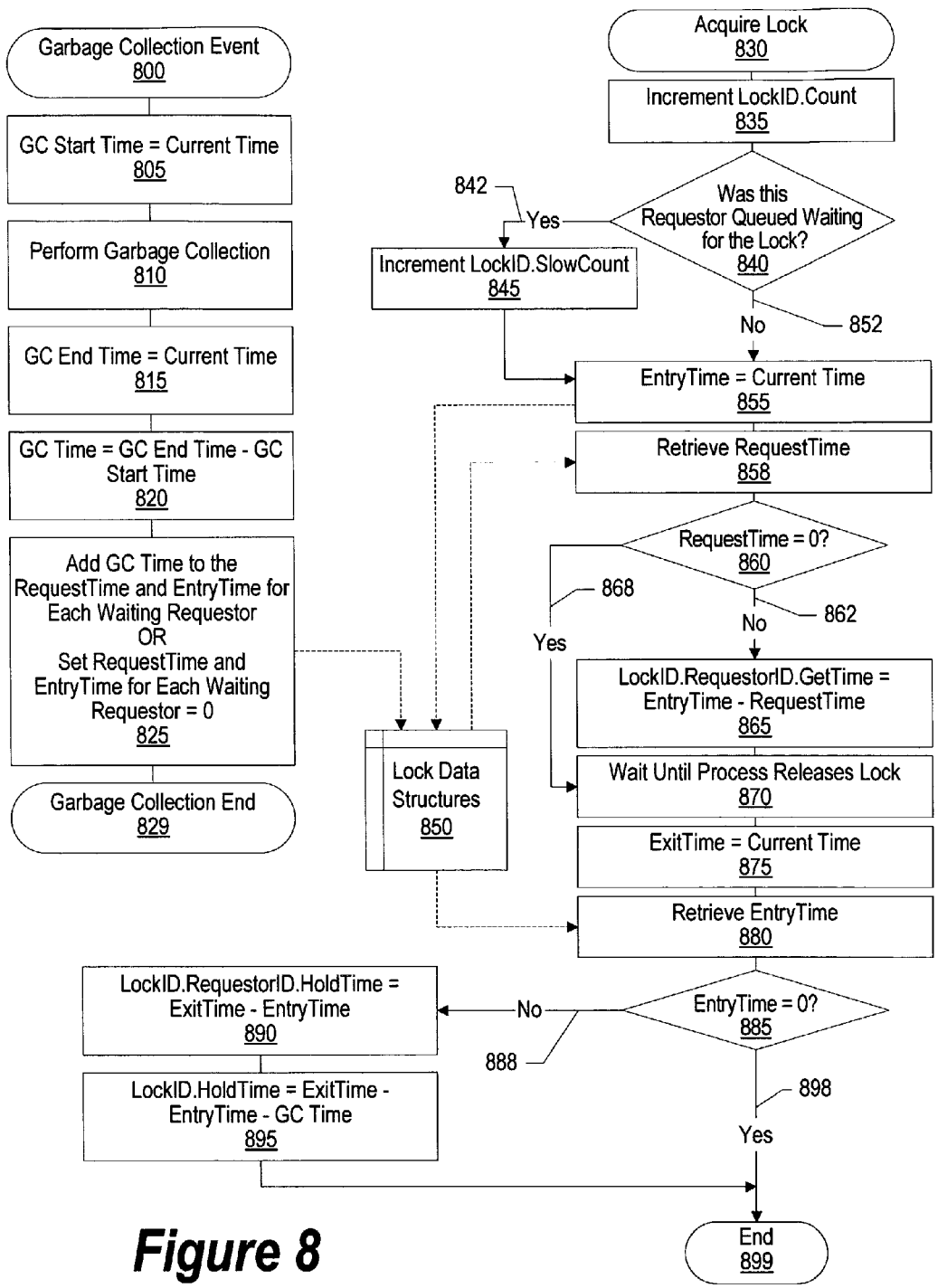
FIG. 8 is a flowchart showing steps taken in tracking an acquired lock.
Figure 9:
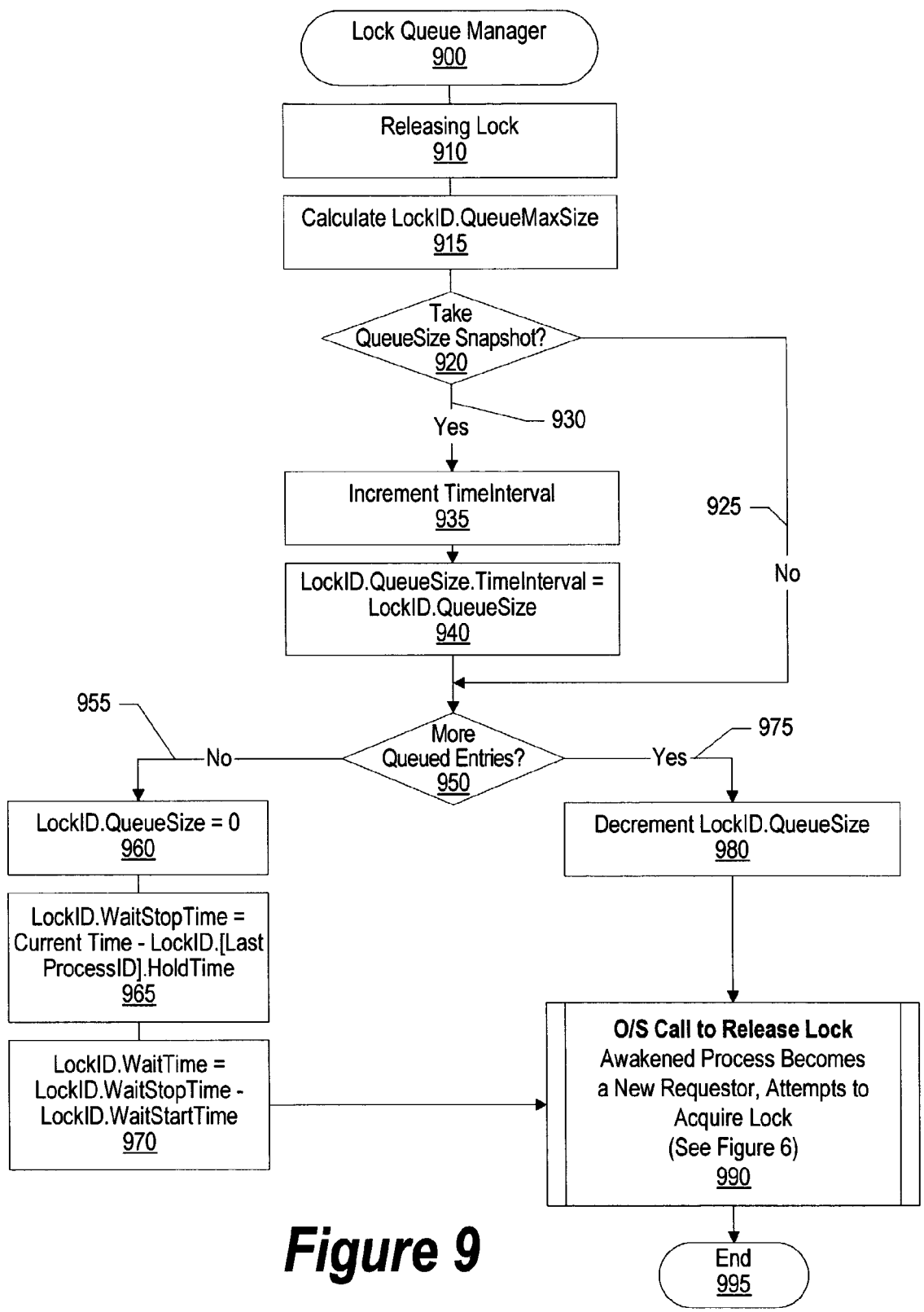
FIG. 9 is a flowchart showing steps taken in handling a application releasing a thick lock.

FIG. 7 is a flowchart showing steps taken in a middleware lock manager processing a lock request. The middleware lock manager is invoked when a lock requester is unable to acquire a corresponding thin lock (see FIG. 6 and corresponding text for further details regarding thin lock processing). The data gathering shown in FIG. 7 is only performed when lock monitoring has been turned on (see FIG. 2, decision 270). In addition, the individual lock metrics shown in FIGS. 7, 8, and 9 are only gathered when the respective metrics have been requested by the user (see FIG. 3 for details regarding turning various metrics on and off). For each of the metrics taken in FIGS. 7, 8, and 9 a determination would be made as to whether the respective metric was being accumulated before the metric gathering steps are performed.

Processing commences at 700, whereupon processing receives a contended lock request (step 704). An entry count corresponding to the requested lock is incremented at step 708. The entry count tracks the number of times a middleware lock manager is entered by a requester corresponding to a particular lock. In an alternate embodiment, the entry count can be incremented after the requester acquires the lock (see FIG. 8, step 835).

A determination is made as to whether the lock request is a recursive request (decision 730). A recursive request is a lock request from a requestor when the requester already owns the lock. If the request is a recursive request, decision 730 branches to "Yes" branch 710 whereupon a recursive count value is incremented corresponding to the lock. The recursive count value tracks the number of times that processing receives a recursive request corresponding to a particular lock. Processing ends at 716.

On the other hand, if the request is not a recursive request, decision 730 branches to "No" branch 718 whereupon a determination is made as to whether a corresponding thick lock is available. A thick lock is a lock that resides within an operating system (see FIG. 1 and corresponding text for further details regarding thick locks). If the thick lock is available, decision 720 branches to "Yes" branch 722 whereupon and entry time value corresponding to the thick lock is set equal to the current time (step 724). The entry time is used to calculate a requestor's get time and hold time (see FIG. 8 and corresponding text for further details regarding time-based metric calculations). The lock requester attempts to acquire the lock at step 770.

When the lock becomes available, middleware lock management processing does not give the requester the lock but rather gives the requestor the chance to acquire the lock. A determination is made as to whether the requester acquired the lock (decision 774). If the requester did not acquire the lock, decision 774 branches to "No" branch 776 which loops back to determine whether to enter a spin loop. On the other hand, if the requester acquired the lock, decision 774 branches to "Yes" branch 778 whereupon processing tracks the acquired lock (pre-defined process block 780, see FIG. 8 and corresponding text for further details). Processing ends at 784.

On the other hand, if the lock is not available, decision 720 branches to "No" branch 730 whereupon a request time corresponding to the lock is set to the current time (step 732). The request time is used to calculate the amount of time it takes a requester to acquire the lock (see FIG. 8 and corresponding text for further details regarding get time calculations).

A determination is made as to whether the lock request is the first waiting requester (decision 736). This determination may be made by detecting whether a queue has been configured to manage other requesters waiting for the lock. If the requester is the first waiting requester, decision 736 branches to "Yes" branch 738 whereupon a wait start time corresponding to the lock is initialized at step 740. The wait start time is used to calculate a total wait time corresponding to the lock (see FIG. 9 and corresponding text for further details regarding wait time calculations). On the other hand, if the requester is not the first waiting requestor, decision 736 branches to "No" branch 742 bypassing wait start time initialization steps.

A determination is made as to whether to enter a spin loop (decision 744). A lock manager may be configured to "spin" a request in order to avoid adding the requester to the queue, which may be expensive in terms of processing time (see FIG. 3 and corresponding text for further details regarding spin loop configuration). If the lock manager is not configured to "spin" a request, decision 744, branches to "No" branch 746 whereupon the requester is added to the queue (step 748). Processing increments a queue size value corresponding to the lock at step 750. The queue size value is used to track the number of requesters that are waiting in the queue for a particular lock. The requester is put to sleep at step 752 until his turn arises to acquire the lock (step 752). Processing ends at 756.

If processing is configured to "spin" the request, decision 744 branches to "Yes" branch 758 whereupon a spin count corresponding to the lock is incremented at step 760. The spin count tracks the number of times a request spins. A determination is made as to whether the lock is available (decision 764). If the lock is available, decision 764 branches to "Yes" branch 766 whereupon the requester attempts to acquire the lock (step 770). On the other hand, if the lock is not available, decision 764 branches to "No" branch 788 whereupon a determination is made as to whether to continue spinning (decision 790). For example, processing may be configured to spin a request a certain number of times before processing puts the request in the queue. If processing should continue to spin the request, decision 790 branches to "Yes" branch 792 which loops back to increment the spin count. This looping continues until processing stops spinning the request, at which point decision 790 branches to "No" branch 796 whereupon processing adds the requester to the queue at step 748.

FIG. 8 is a flowchart showing steps taken in tracking an acquired lock. Garbage collection event processing 800 occurs simultaneously with acquire lock processing 830. Garbage collection event processing 800 accounts for time taken to perform garbage collection. Processing commences at 800 whereupon a garbage collection start time (GC Start Time) is set to the current time (step 805). Garbage collection processing takes place (step 810). Processes waiting for locks do not perform lock processes until the garbage collection event completes. In order for more accurate timing metrics, the garbage collection event accounts for the time that the locks were unavailable due to the garbage collection process. When the garbage collection is completed, a garbage collection end time (GC End Time) is set to the current time (step 815). The amount of time that was used for garbage collection (GC Time) is calculated by subtracting the GC Start Time from the GC End Time (step 820). The RequestTimes and EntryTimes for each waiting requester stored in lock data structures memory area 850 is adjusted to account for the garbage collection time (step 825). In one embodiment, the RequestTime and EntryTime for each waiting requester is increased by adding the garbage collection time (GC Time) to each respective value. In another embodiment, the RequestTime and EntryTime for each waiting requester is set to zero. The first embodiment more accurately tracks metrics based upon RequestTime and EntryTime, while the second embodiment, while not as accurate, takes less time to complete and allows the instrumentation to identify times that were affected by a garbage collection event. Garbage collection processing ends at 829.

Acquire lock processing commences at 830 whereupon an entry count corresponding to the lock is incremented at step 835. The entry count tracks the number of times a middleware lock manager is entered by a requester corresponding to a particular lock. In an alternate embodiment, the entry count can be incremented upon receiving the request from the requester (i.e., before the lock is actually acquired, see FIG. 7, step 704). A determination is made as to whether the requester had been queued while waiting for the lock (decision 840). If the requestor had been queued, decision 840 branches to "yes" branch 845 whereupon another counter (LockID.SlowCount) is incremented to count the number of requesters that have been queued waiting for the lock (step 845).

The time that the requester receives the lock is stored (step 855) and the time that the requester first requested the lock is retrieved (step 858) from lock data structures 850. The requestor's RequestTime may have been altered by a garbage collection event (see steps 800 through 829 for details). A determination is made as to whether the requestor's RequestTime is unknown (i.e., set to zero, null, etc.) due to a garbage collection event (decision 860). If the request time is known, decision 860 branches to "no" branch 862 whereupon the amount of time that elapsed before the requester received the lock is calculated (step 865). The calculation is performed by subtracting the request time from the current, or entry, time. On the other hand, if the request time is not known, decision 860 branches to "yes" branch 868 bypassing the calculation shown in step 865.

Processing then waits until the requestor releases the lock (step 870). The time that the requester released the lock is stored (step 875) and the time that the requester first entered the lock (EntryTime) is retrieved (step 880) from lock data structures 850. The EntryTime retrieved may not be the same as the entry time stored in step 855 because an intervening garbage collection event may have occurred which altered the requestor's EntryTime.

A determination is made as to whether the retrieved EntryTime is unknown (i.e., set to zero, null, etc.) due to a garbage collection event (decision 885). If the entry time is known, decision 885 branches to "no" branch 888 whereupon the amount of time that elapsed while the requester held the lock is calculated (step 890). The calculation is performed by subtracting the current time (i.e., the exit time) from the entry time. In addition, the same calculation is made to keep track of the amount of time the lock was held (step 895), irrespective of the requester that held the lock. On the other hand, if the entry time is not known, decision 885 branches to "yes" branch 898 bypassing the calculations shown in steps 890 and 895. Acquire lock processing thereafter ends at 899.

FIG. 9 is a flowchart showing steps taken in an application releasing a thick lock. A thick lock is a software lock that resides in an operating system layer. Processing commences at 900, whereupon an application thread releases the thick lock (step 910).

A maximum queue size is calculated for the thick lock (step 915). The maximum queue size is calculated by determining the largest number of entries that have been queued waiting for the lock. This calculation is made by comparing the current number of queued items with the maximum queue size value. If the number of queued items is greater than the maximum queue size, then the maximum queue size value is updated to be equal to the number of queued items. A determination is made as to whether a queue size snapshot should be taken (decision 920). A queue size snapshot captures the number of entries in the queue at various time intervals so that the user can analyze the number of processes waiting for the lock across a time span. For example, the queue size snapshot can be taken every second. If it is not time to take a queue size snapshot, decision 920 branches to "no" branch 925 bypassing the snapshot steps. On the other hand, if it is time to take a queue size snapshot, decision 920 branches to "yes" branch 930 whereupon a time interval is incremented (i.e., representing snapshot interval 1, 2, 3, etc.) at step 935. The current queue size for this time interval is saved (step 940) for later retrieval and analysis by the user.

A determination is made as to whether there are application threads in a queue waiting to acquire the thick lock (decision 950). If there are more threads in the queue waiting to acquire the thick lock, decision 950 branches to "Yes" branch 975 whereupon a queue size field corresponding to the thick lock (lockid.queuesize) is decremented (step 980). The queue size field tracks the number of application threads waiting for a particular lock. The queue size field may be configured to track various metrics of the queue.

On the other hand, if there are no threads in the queue waiting to acquire the thick lock, decision 950 branches to "No" branch 955 whereupon the lockid.queuesize field is set to zero at step 960 (i.e., reset the lockid.queuesize field). Processing calculates a lockid.waitstop time by subtracting a lastprocessid.holdtime from the current time (step 965). The lockid.waitstop time corresponds to the time that the last thread (i.e. process) acquired the lock. The lastprocessid.hold time is the amount of time the last thread (i.e. process) used the lock. Processing calculates a wait time (lockid.waittime) for the thick lock by subtracting a lockid.waitstarttime from the lockid.waitstoptime (step 970). The lockid.waittime field corresponds to the total time spent by one or more threads to acquire the thick lock (see FIG. 10 and corresponding text for further details regarding wait time calculations). The lockid.waitstart time corresponds to the starting time that a first started waiting for the thick lock (see FIG. 7 and corresponding text for further details regarding wait start time).

An operating system (OS) releases the thick lock which allows other threads the ability to acquire the lock. When the OS releases the thick lock, middleware lock management halts until contention arises again with the corresponding thin lock (predefined process 990, see FIG. 6 and corresponding text for further details regarding thin lock processing). Lock queue manager processing ends at 995.

Figure 10:
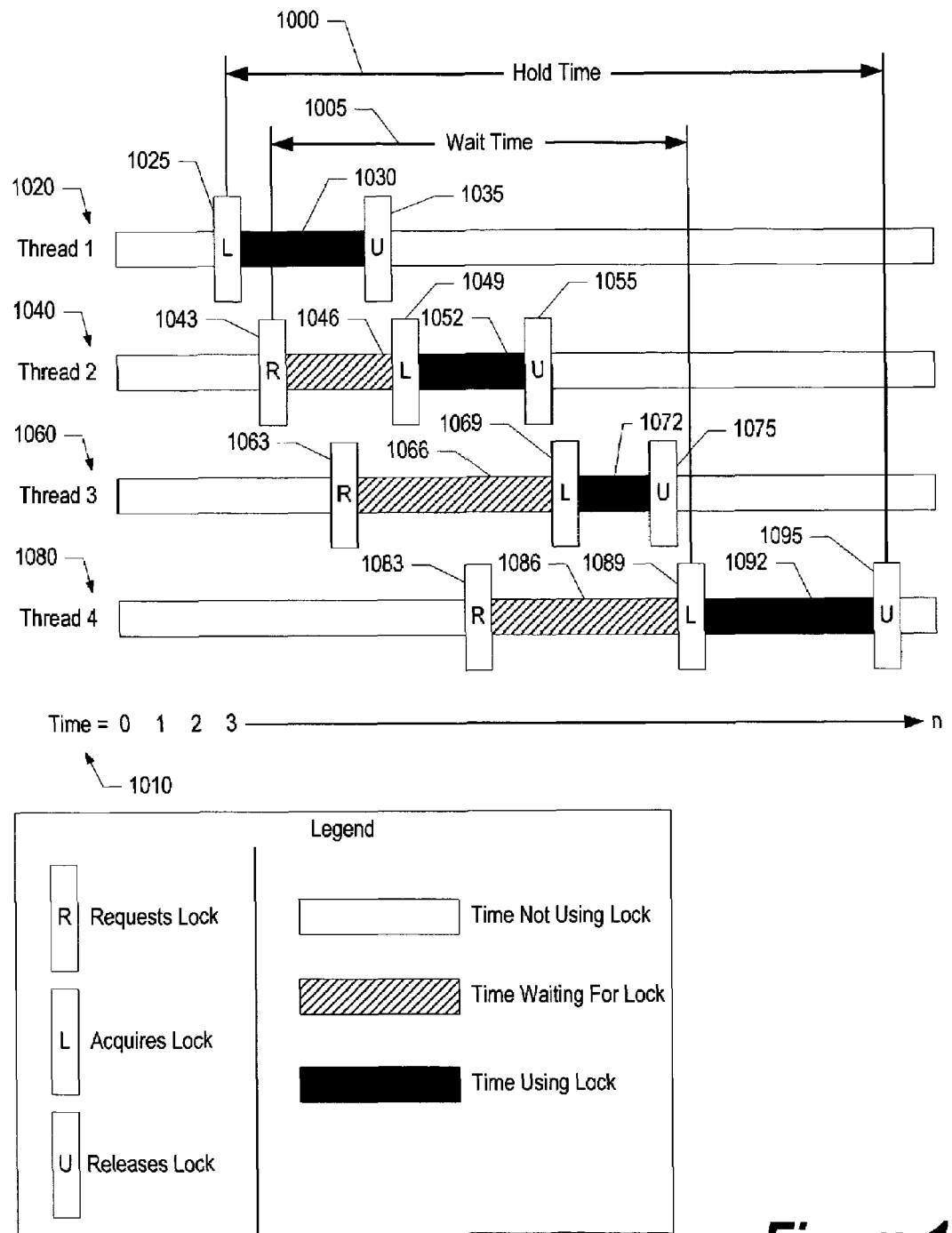
FIG. 10 is a diagram showing multiple threads requesting a lock.

FIG. 10 is a diagram showing multiple threads requesting a lock. Thread 1020, thread 1040, thread 1060, and thread 1080 are requesting the same lock at different times. Timeline 1010 shows time starting at time "0", and going to time "n". Thread 1020 is the first thread to request the lock, and acquires the lock at 1025. Thread 1020 uses the lock during 1030, and releases the lock at 1035.

Thread 1040 is the second thread to request the lock at 1043. Since thread 1020 owns the lock at the time corresponding to 1043, thread 1040 waits for time 1046 until thread 1020 releases the lock, at which point thread 1040 acquires the lock at 1049. Time 1046 is the time that thread 1040 waits to acquire the lock which is also referred to as 1040's "get time". Thread 1040 uses the lock during 1052, and releases the lock at 1055.

Thread 1060 is the third thread to request the lock at 1063. Since thread 1020 owns the lock at the time corresponding to 1063 and since thread 1040 is the next thread to have the chance to acquire the lock, thread 1060 waits for time 1066 until thread 1040 releases the lock, at which point thread 1060 acquires the lock at 1069. Time 1066 is the time that thread 1060 waits to acquire the lock which is also referred to as 1060's "get time". Thread 1060 uses the lock during 1072, and releases the lock at 1075.

Thread 1080 is the fourth thread to request the lock at 1083. Since thread 1040 owns the lock at the time corresponding to 1083 and since thread 1060 is the next thread to have the chance to acquire the lock, thread 1080 waits for time 1086 until thread 1060 releases the lock, at which point thread 1080 acquires the lock at 1089. Time 1086 is the time that thread 1080 waits to acquire the lock which is also referred to as 1080's "get time". Thread 1080 uses the lock during 1092, and releases the lock at 1095.

Processing tracks various metric values for the lock (see FIG. 5 and corresponding text for further details regarding metric values). Processing tracks hold time 1000 which is the total time that one or more threads use the lock. The example in FIG. 10 shows that hold time 1000 starts at 1025 when thread 1020 acquires the lock, and ends at 1095 when thread 1080 releases the lock. Processing also tracks wait time 1005 which is the total time that one or more threads wait for the lock. The example in FIG. 10 shows that wait time 1005 starts at 1043 when thread 1040 starts to wait for the lock, and ends at 1089 when thread 1080 acquires the lock (i.e. stops waiting for the lock). Processing may also track a total "get time" for a particular lock. The lock's total get time is the summation of each threads time waiting for the lock. In FIG. 10, the get time is calculated by adding 1046, 1066, and 1086. The total get time, along with other metric values, may be used by an instrumentation user to analyze the performance of a computer system.

Figure 11:
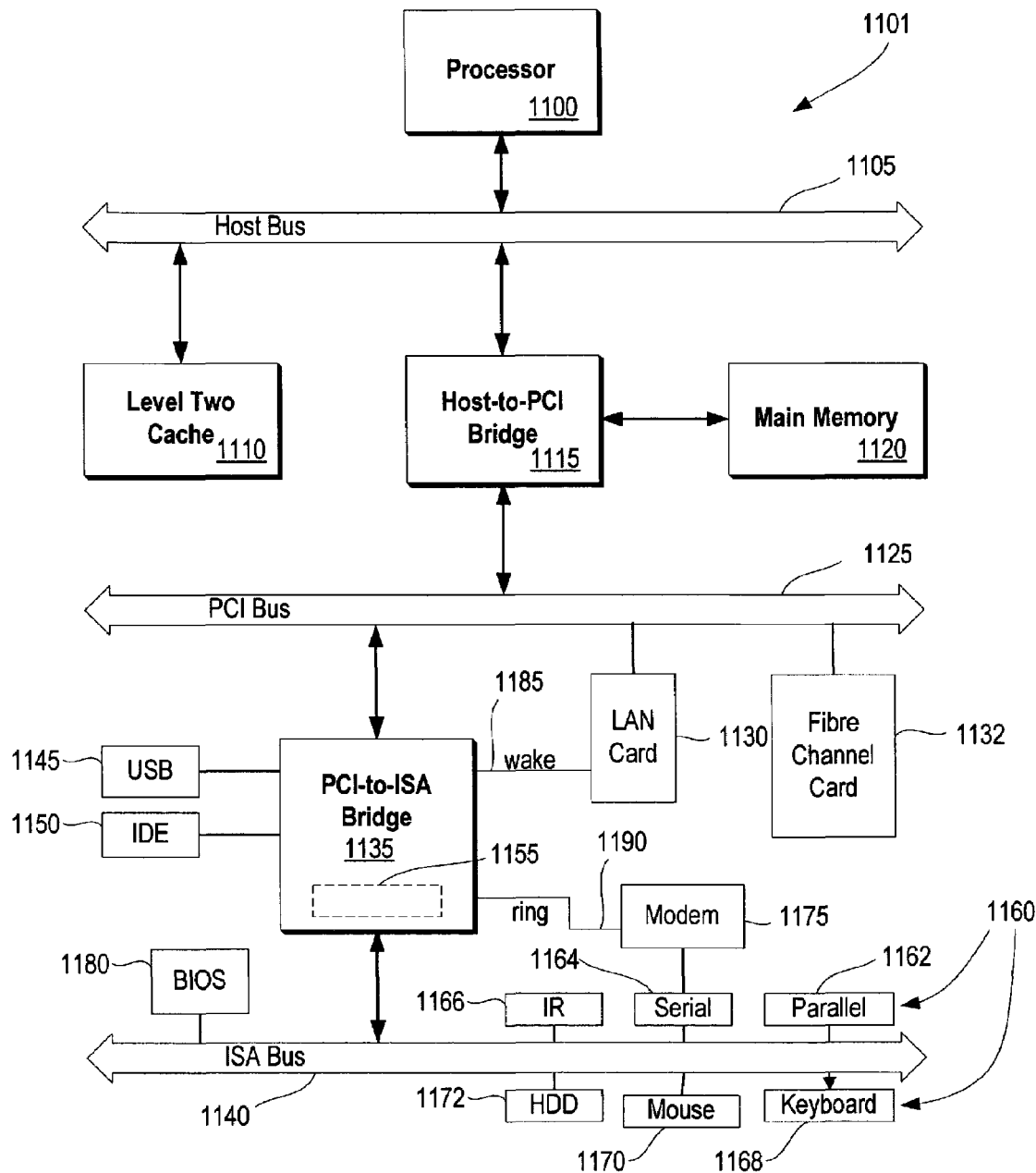
FIG. 11 is a block diagram of an information handling system capable of implementing the present invention.

FIG. 11 illustrates information handling system 1101 which is a simplified example of a computer system capable of performing the operations described herein. Computer system 1101 includes processor 1100 which is coupled to host bus 1105. A level two (L2) cache memory 1110 is also coupled to the host bus 1105. Host-to-PCI bridge 1115 is coupled to main memory 1120, includes cache memory and main memory control functions, and provides bus control to handle transfers among PCI bus 1125, processor 1100, L2 cache 1110, main memory 1120, and host bus 1105. PCI bus 1125 provides an interface for a variety of devices including, for example, LAN card 1130. PCI-to-ISA bridge 1135 provides bus control to handle transfers between PCI bus 1125 and ISA bus 1140, universal serial bus (USB) functionality 1145, IDE device functionality 1150, power management functionality 1155, and can include other functional elements not shown, such as a real-time clock (RTC), DMA control, interrupt support, and system management bus support. Peripheral devices and input/output (I/O) devices can be attached to various interfaces 1160 (e.g., parallel interface 1162, serial interface 1164, infrared (IR) interface 1166, keyboard interface 1168, mouse interface 1170, fixed disk (HDD) 1172 coupled to ISA bus 1140. Alternatively, many I/O devices can be accommodated by a super I/O controller (not shown) attached to ISA bus 1140.

BIOS 1180 is coupled to ISA bus 1140, and incorporates the necessary processor executable code for a variety of low-level system functions and system boot functions. BIOS 1180 can be stored in any computer readable medium, including magnetic storage media, optical storage media, flash memory, random access memory, read only memory, and communications media conveying signals encoding the instructions (e.g., signals from a network). In order to attach computer system 1101 to another computer system to copy files over a network, LAN card 1130 is coupled to PCI bus 1125 and to PCI-to-ISA bridge 1135. Similarly, to connect computer system 1101 to an ISP to connect to the Internet using a telephone line connection, modem 1175 is connected to serial port 1164 and PCI-to-ISA Bridge 1135.

While the computer system described in FIG. 11 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of monitoring a bimodal software lock, said method comprising:
   monitoring the bimodal software lock only when the bimodal software lock is contended, wherein the monitoring further includes:
   identifying one or more metrics corresponding to the bimodal software lock;
   calculating a metric value corresponding to each of the metrics; and
   storing the metric values in a memory area.

2. The method as described in claim 1 wherein at least one of the metrics is selected from a group consisting of an entry count, a slow count, a recursive count, a queue size count, a spin loop count, a hold time, a get time, and a wait time.

3. The method as described in claim 1 wherein the metrics include one or more time-based metrics, the method further comprising:
   identifying a garbage collection event; and
   adjusting the metric values corresponding to each of the time-based metrics that occurred during the garbage collection event.

4. The method as described in claim 1 wherein one of the metrics is an entry count, the method further comprising:
   detecting one or more lock requests corresponding to the bimodal software lock; and
   incrementing the metric value corresponding to the entry count in response to each detected request.

5. The method as described in claim 1 wherein one of the metrics is a slow count, the method further comprising:
   detecting one or more processes that acquire the bimodal software lock; and
   incrementing the metric value corresponding to the slow count in response to each detected lock acquisition.

6. The method as described in claim 1 wherein one of the metrics is a recursive count, the method further comprising:
   detecting one or more lock requests from a process that currently owns the bimodal software lock; and
   incrementing the metric value corresponding to the recursive count in response to each detected request.

7. The method as described in claim 1 wherein one of the metrics is a queue size count, the method further comprising:
   adding a first entry to a queue of processes waiting for the bimodal software lock;
   incrementing the queue size count in response to detecting the adding;
   removing a second entry from the queue; and
   decrementing the queue size count in response to detecting the removing.

8. An information handling system comprising:
   one or more processors;
   a memory accessible by the processors;
   an operating system for managing information handling system resources, the operating system including bimodal software locking facilities;
   a middleware application that runs on the operating system, the middleware application including a lock manager for controlling access to shared application resources; and
   an instrumentation tool f or monitoring a bimodal software lock managed by the lock manager only when the bimodal software lock is contended, the instrumentation tool including:
   means for identifying one or more metrics corresponding to the bimodal software lock;
   means for calculating a metric value corresponding to each of the metrics; and
   means for storing the metric values in a memory area.

9. The information handling system as described in claim 8 wherein at least one of the metrics is selected from a group consisting of an entry count, a slow count, a recursive count, a waiter count, a spin loop count, a hold time, a get time, and a wait time and wherein the middleware application is selected from a group consisting of a Java virtual machine, a virtual machine, an application server, an application integrator, and a database manager.

10. The information handling system as described in claim 8 wherein the metrics include one or more time-based metrics, the information handling system further comprising:
   a system clock;
   means for identifying a garbage collection event;
   means for calculating a garbage collection elapsed time using the system clock; and
   means for adjusting the metric values from each of the time-based metrics that occurred during the garbage collection event based upon the garbage collection elapsed time.

11. The information handling system as described in claim 8 wherein one of the metrics is an entry count, the information handling system further comprising:
   means for detecting one or more lock requests corresponding to the bimodal software lock; and
   means for incrementing the metric value corresponding to the entry count in response to each detected request.

12. The information handling system as described in claim 8 wherein one of the metrics is a stow count, the information handling system further comprising:
   means for detecting one or more processes that acquire the bimodal software lock; and
   means for incrementing the metric value corresponding to the slow count in response to each detected look acquisition.

13. The information handling system as described in claim 8 wherein one of the metrics is a waiter count, the information handling system further comprising:
   means for adding a first entry to a queue of processes waiting for the bimodal software lock;
   means for incrementing the waiter count in response to detecting the adding;
   means for removing a second entry front the queue; and
   means for decrementing the waiter count in response to detecting the removing.

14. A computer program product stored on a computer operable media for monitoring a bimodal software lock, said computer program product comprising:
   means for monitoring the bimodal software lock only when the bimodal software lock is contended, wherein the means for monitoring further includes:
      means for identifying one or more metrics corresponding to the bimodal software lock;
      means for calculating a metric value corresponding to each of the metrics; and
      means for storing the metric values in a memory area.

15. The computer program product as described in claim 14 wherein the metrics include one or more time-based metrics, the computer program product further comprising:
   means for identifying a garbage collection event;
   means for calculating a garbage collection elapsed time corresponding to the garbage collection event; and
   means for adjusting the metric values from each of the time-based metrics that occurred during the garbage collection event based upon the garbage collection elapsed time.

16. The computer program product as described in claim 14 wherein one of the metrics is an entry count, the computer program product further comprising:
   means for detecting one or more lock requests corresponding to the bimodal software lock; and
   means for incrementing the metric value corresponding to the entry count in response to each detected request.

17. The computer program product as described in claim 14 wherein one of the metrics is a slow count, the computer program product further comprising:
   means for detecting one or more processes that acquire the bimodal software lock; and
   means for incrementing the metric value corresponding to the slow count in response to each detected lock acquisition.

18. The computer program product as described in claim 14 wherein one of the metrics is a recursive count, the computer program product further comprising:
   means for detecting one or more lock requests from a process that currently owns the bimodal software lock; and
   means for incrementing the metric value corresponding to the recursive count in response to each detected request.

19. The computer program product as described in claim 14 wherein one of the metrics is a waiter count, the computer program product further comprising:
   means for adding a first entry to a queue of processes waiting for the bimodal software lock;
   means for incrementing the waiter count in response to detecting the adding;
   means for removing a second entry from the queue; and
   means for decrementing the waiter count in response to detecting the removing.

* * * * *